United States Patent
Knebel et al.

(10) Patent No.: US 6,677,566 B2
(45) Date of Patent: Jan. 13, 2004

(54) DEVICE AND METHOD FOR EXAMINING AND MANIPULATING MICROSCOPIC OBJECTS

(75) Inventors: Werner Knebel, Kronau (DE); Juergen Hoffman, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 139 days.

(21) Appl. No.: 09/923,100

(22) Filed: Aug. 6, 2001

(65) Prior Publication Data

US 2002/0020800 A1 Feb. 21, 2002

(30) Foreign Application Priority Data

Aug. 8, 2000 (DE) .......................... 100 39 520

(51) Int. Cl.[7] .............................. G02B 27/40
(52) U.S. Cl. .................. 250/201.3; 356/317
(58) Field of Search .................. 250/201.3, 251, 250/365; 356/317, 318, 246, 32, 451; 359/350, 385, 204, 368, 369

(56) References Cited

U.S. PATENT DOCUMENTS

| | | | |
|---|---|---|---|
| 4,893,886 A | * 1/1990 | Ashkin et al. | 359/350 |
| 5,034,613 A | 7/1991 | Denk et al. | 250/458.1 |
| 6,067,859 A | * 5/2000 | Kas et al. | 73/800 |
| 6,094,300 A | * 7/2000 | Kashima et al. | 359/385 |
| 6,139,831 A | * 10/2000 | Shivashankar et al. | 530/351 |
| 6,159,749 A | * 12/2000 | Liu | 436/527 |

FOREIGN PATENT DOCUMENTS

| | | |
|---|---|---|
| DE | 10033549.7 | 7/1997 |
| DE | 19653413 | 6/1998 |
| DE | 4414940 | 7/1998 |
| DE | 19654210 | 12/1999 |
| DE | 19924709 | 12/2000 |
| EP | 0753779 | 1/1997 |

OTHER PUBLICATIONS

Karl Otto Greulich "Micromanipulation by Light in Biology and Medicine" 1999, pp. 1–300.

* cited by examiner

*Primary Examiner*—Kevin Pyo
*Assistant Examiner*—Seung C. Sohn
(74) *Attorney, Agent, or Firm*—Davidson, Davidson & Kappel, LLC

(57) ABSTRACT

The present invention relates to a device and to a method for examining and manipulating microscopic objects (1), with a microscope (2), a light source (3, 4) used to illuminate the object (1), an illumination beam path (5), a detector (6) used to detect the light returning from the object (1), a detection beam path (7), a light source (8) used for the object manipulation and a manipulation light beam path (9). The device according to the invention and the method according to the invention are intended to permit three-dimensional examination and manipulation of objects (1) whose dimension along the optical axis is greater than the depth of focus of the microscope objective used, with the additional intention that object manipulation should be possible at all sites of the three-dimensional object (1).

25 Claims, 6 Drawing Sheets

DEVICE AND METHOD FOR EXAMINING AND MANIPULATING MICROSCOPIC OBJECTS

CROSS REFERENCE TO RELATED APPLICATIONS

This invention claims priority of the German patent application 100 39 520.1 which is incorporated by reference herein.

FIELD OF THE INVENTION

The present invention relates to a device and to a method for examining and manipulating microscopic objects.

BACKGROUND OF THE INVENTION

Devices of the generic type have been known in practice for a considerable time. Merely by way of example, reference may be made to "Micromanipulation by Light in Biology and Medicine" by Karl Otto Greulich, Birkhäuser Verlag 1999. That document describes how, during the microscopic examination of objects with the aid of focused laser beams, forces are exerted on particles, particles are comminuted, perforated or ablation can be performed. The possibilities for object manipulation are used especially in cell biology in order, for example, to manipulate the interior of unopened cells without hindrance. In this case, above all two different manipulation processes are customary. On the one hand, objects or object regions are illuminated with focused infrared light, with the result that individual particles of the object or object regions in the vicinity of the manipulation focus are captured and are moved along when the position of the manipulation focus in the focal plane changes (optical tweezers), so that a force can, for example, be applied to them. If pulsed, focused UV light is applied to an object region then, because UV light has a high energy density, biological material can be cut or perforated with high spatial resolution (nanoscalpel).

In another examination method in cell biology, objects are prepared with so-called "caged compounds". These compounds contain calcium or amino acids such as, for example, glutamate, and are bonded to or enclosed by sequestrants (gelators). These compounds can be broken up by irradiation with UV light, with the result that the calcium or the released glutamate is capable of triggering further reactions in the cell (photoactivation). Photoactivation can also be achieved with the aid of two-photon processes. Merely by way of example, reference may in this regard be made to U.S. Pat. No. 5,034,613 and to DE 44 14 940, which describe the use of two-photon absorption by fluorescent dyes in scanning microscopy.

With the aid of optical tweezers, it is possible to determine bonding forces between cell elements, for example between microtubuli and other cytoskeletal elements, or to measure contraction forces of muscle fibers.

Currently, the laser light used to manipulate the object is input into the beam path of a conventional light microscope. The manipulation of the object is generally carried out by moving the sample with the microscope stage. The manipulation and the examination or observation of the object is in this case carried out either in the fluorescent-light mode or in the transmitted-light mode of a conventional microscope.

A problem with these examinations and manipulations of objects, however, is that because of the visualization properties of a conventional microscope, only the object region that is located in the depth of focus of the microscope objective is two-dimensionally visualized. The object regions beyond this depth of focus, however, are interferingly superimposed on the image, which makes exact object manipulation difficult or impossible. Accordingly, such examinations and manipulations are primarily performed on objects which have a small dimension along the optical axis, so that these objects can be brought completely into the depth of focus of the microscope objective. The object can therefore be visualized fully during a visualization process, and interfering superimpositions of object regions beyond the depth of focus of the microscope objective can thereby be avoided.

But if examinations and manipulations are to be carried out on objects which have a—compared to the depth of focus of the microscope objective—large dimension along the optical axis, on the one hand the previously described visualization problem occurs and, on the other hand, it is not readily possible to carry out object manipulations in different planes parallel to the focal plane of the microscope objective. The reason for this is that, for simultaneous manipulation at a plurality of object sites with a different position along the optical axis, the foci of the light for manipulation would correspondingly have to be adjusted differently, which is currently not provided for with conventional object-manipulation instruments. Corresponding driving of such a manipulation device by a user would furthermore require that the three-dimensional object can be visualized with sufficient resolution along the optical axis to adjust the object regions for manipulation, but this is virtually impossible beyond a precision of one micrometer with a conventional microscope.

The utilization of a laser for a nanoscalpel disadvantageously cuts cylindrical sections into the three-dimensional object, so that this type of manipulation is unsuitable for many applications.

DE 199 24 709 discloses a device with which components can be positioned rapidly, with high resolution and precisely. In particular, an objective revolver of a microscope can be positioned along the optical axis with this device (objective revolver scanning arrangement).

DE 196 53 413, or EP 0 753 779, discloses devices which can focus collimated laser light at from 20 to 50 illumination foci in the intermediate image plane, or object plane, of a microscope. The light is laser light, which is suitable for two-photon excitation of fluorescent objects.

DE 196 54 210 C2 and DE 100 33 549.7 disclose devices per se for deflecting a light beam essentially in two mutually perpendicular directions.

DE 44 14 940 and U.S. Pat. No. 5,034,613 disclose confocal scanning microscopes, in which fluorescent objects are excited in fluorescence by two-photon processes.

SUMMARY OF THE INVENTION

It is therefore an object of the present invention to examine and manipulate even three-dimensional objects, whose dimension along the optical axis is greater than the depth of focus of the microscope objective used, with the additional intention that object manipulation should be possible at all sites of the three-dimensional object.

The above object is accomplished by a device for examining and manipulating microscopic objects comprising: a confocal scanning microscope, a first light source for illuminating the object, wherein the first light source defines an illumination beam path, a detector for detecting the light returning from the illuminated object, wherein the detector defines a detection beam path, a second light source for manipulating the object, wherein the second light source defines a manipulation light beam path, a first beam deflection device is provided in the illumination light beam, and a second beam deflection device is provided in the manipulation light beam.

Three-dimensional detection of the object, in which discrimination of the object light contributions which come from regions that lie beyond the depth of focus of the microscope objective, is furthermore intended to be possible.

The object is accomplished with a device for examining and manipulating microscopic objects comprising: a confocal scanning microscope, a first light source for illuminating the object, wherein the first light source defines an illumination beam path, a detector for detecting the light returning from the illuminated object, wherein the detector defines a detection beam path, a second light source for manipulating the object, wherein the second light source defines a manipulation light beam path, a first beam deflection device is provided in the illumination light beam, a second beam deflection device is provided in the manipulation light beam, wherein the manipulation light beam path and the illumination light beam path are separated from each other and at least one beam splitter is provided prior to the microscope objective for combining the manipulation light beam path and the illumination light beam path.

An additional object of the invention is to provide a method which allows a three-dimensional detection and/or manipulation of an object.

The above object is accomplished by a method which comprises the steps of:

illuminating the object with at least one light source;

detecting the light returning from the object, and manipulating the object with a second light source wherein the manipulation of the object is carried out simultaneously with the confocal object detection and the detection is done three-dimensionally during the manipulation.

According to the invention, it has been recognized for the first time that, with a confocal scanning microscope, the light contributions coming from the object and outside the depth of focus of the microscope objective can be effectively suppressed or stopped-out because of the confocal principle. The resolution along the optical axis of a confocal scanning microscope is furthermore higher than that of a conventional light microscope, so that on the one hand three-dimensional visualization of the object for manipulation is possible and, on the other hand—because of the three-dimensional information available about the object—three-dimensional object manipulation is hereby made possible. Three-dimensional object information with high resolution along the optical axis is a fundamental prerequisite for exact three-dimensional driving of the manipulation light beam. Object manipulation may involve utilizing at least one optical tweezers, carrying out an object change using at least one nanoscalpel, bleaching fluorescent dyes and/or releasing caged compounds.

In a preferred embodiment, at least two beam deflection devices are provided. An example of a beam deflection device that may be provided is a mirror which is mounted so as to rotate about two axes, preferably being cardan-suspended. Another possible beam deflection device is a mirror system consisting of two mirrors, each mounted respectively so as to rotate about one axis. A preferred embodiment uses a device for deflecting a light beam substantially in two mutually perpendicular directions, according to DE 196 54 210 C2 or DE 100 33 549.7. The use of an AOD (acousto-optical deflector) or an EOM (electro-optical modulator) as a beam deflection device might also be conceivable.

In a specific embodiment, deflection of the illumination light beam using a beam deflection device is provided. The manipulation light beam is likewise deflected by a beam deflection device. The deflection of the illumination light beam is carried out independently of the deflection of the manipulation light beam since, in general, the illumination light beam is used for two- or three-dimensional detection of the object, whereas the manipulation light beam is used for manipulation of the object or individual object regions and different deflection is required than in the case of the illumination light beam.

In an advantageous embodiment, the manipulation light beam path and the detection/illumination beam path run substantially separately from one another. To that end, for example, the detection/illumination beam path could run through a microscope objective and the manipulation light beam path could run through a lens which is arranged on the opposite side from the microscope objective with respect to the focal plane of the microscope objective. In the simplest form, this lens could be designed as a microscope condenser, although it is also possible to employ another microscope objective as the lens. If two microscope objectives arranged opposite one another are used, it is preferable to use microscope objectives which have the same, or at least comparable, basic technical data such as e.g. magnification, immersion medium and/or numerical aperture.

It the manipulation light beam path and the detection/illumination beam path overlap at least partially, provision is made that the manipulation light beam path and the detection/illumination beam path can be combined by a beam splitter. The beam splitter could then be designed either as a chromatic beam splitter or as a polarization beam splitter. Beam combination in which one of the scanning mirrors arranged in the common beam path is used as a beam deflection device for the beam combination, is also conceivable. In this case, the scanning mirror is transparent for one of the two beam paths, whereas it acts as a mirror for the other beam path.

In a particularly advantageous embodiment, provision is made that the focus position of the manipulation light along the optical axis is changeable. As a result, three-dimensional object manipulation is possible by being able to adjust the focus position of the manipulation light to different positions along the optical axis, so that object manipulation is possible even in object regions that lie beyond the currently adjusted depth of focus of the microscope objective. Specifically, the change of the focus position of the manipulation light could be carried out using focusing means arranged mobile between the light source and the object. Beam splitting of the manipulation light might also be conceivable, i.e. so as to position a plurality of manipulation light foci in different planes along the optical axis. The manipulation light could then be split into a number of subsidiary beams equal to the number of different planes, along the optical axis, in which manipulation light foci are to be positioned. Each subsidiary beam of the manipulation light could in this case be provided with a focusing means assigned to this subsidiary beam. As a result of the one or more focusing means acting only in the manipulation light beam path, positioning of a focus position of the manipulation light even outside the currently adjusted depth of focus of the microscope objective is possible.

The change of the manipulation light focus position, in a preferred embodiment, is accompanied by a change of the illumination light focus position. In particular, provision is made that the change of the two focus positions is carried out simultaneously. The focus change could then be carried out using a common objective revolver scanning arrangement, as disclosed for example by DE 199 24 709. In this case, the detection/illumination beam path and the manipulation light beam path run together through the optical component which is moved by the objective revolver scanning arrangement, and is for example designed in the form of a microscope objective.

In a preferred embodiment, the manipulation light beam is used as optical tweezers and/or as a nanoscalpel. A zoom lens is provided in the manipulation light beam path for changing the shape of the manipulation light focus. Hence, for example, the focus radius of the manipulation light beam can be decreased or increased with the aid of the zoom lens, which leads to a change in the force on the object for manipulation, or can change the shape of the nanoscalpel, respectively.

The beam deflection device or the beam deflection devices, in a specific embodiment, can be coupled to the microscope interface for conventional direct-light illumination and/or to an additional interface on the microscope. As a result, it is advantageously possible to use already existing microscope interfaces, which permit simple upgrading of already installed microscope systems.

At least one spectrally selective element is provided to input the illumination and/or manipulation light. Light of at least one specific wavelength can be selected and input into the respective beam path and/or the optical power of the light to be input can be varied by the spectrally selective element. The spectrally selective element could comprise an AOTF (acousto-optical tunable filter), AOBS (acousto-optical beam splitter), AOD (acousto-optical deflector) and/or EOM (electro-optical modulator) and be driven by a control computer, preferably as a function of the illumination and/or manipulation beam position. As a result, selective input of light having a plurality of wavelengths into the illumination and/or manipulation light beam path is possible, the input optical power also being controllable as a function of the corresponding beam position. As a result, fast switching of the manipulation light beam on and off can in particular be performed, which is generally required for the simultaneous manipulation of a plurality of manipulation sites by one manipulation light beam. To that end, the manipulation light beam must be deflected to the individual manipulation sites and, during the deflection process, the manipulation light beam must be stopped-out from the manipulation light beam path.

Particularly preferably, the object manipulation is carried out simultaneously with the confocal object detection. As a result, the object manipulation which is carried out can advantageously be examined with the aid of the confocal object detection at an increased resolution along the optical axis compared with conventional microscopy. In particular, provision is made that an object is three-dimensionally detected during the object manipulation. To that extent, independent deflection, or positioning, of the detection/illumination beam path and of the manipulation light beam path is then necessary.

Particularly advantageously, the object manipulation is carried out three-dimensionally. In particular, provision is then also made that object manipulation is carried out at different manipulation sites in the planes parallel to the focal plane of the microscope objective.

With the method according to the invention, it is possible to indirectly measure bonding forces between individual objects or object regions. To that end, at least two manipulation sites relating to the object or the object region can be captured and displaced in the captured state with the aid of the optical tweezers. During the displacement of the manipulation sites, provision is made that the object or the object regions and/or the displacement of the manipulation sites is detected. If, for example, a latex bead is specifically attached to each of the two ends of a muscle fiber, then the two latex beads could each be captured by an optical tweezers. Displacement of one or both beads would also cause a change to the muscle fiber. The detection of the muscle fiber during the displacement of the optical tweezers can provide information about prevailing bonding forces and the properties of the muscle fiber.

In an alternative procedure, at least two manipulation sites relating to the object or the object region are captured with the aid of the optical tweezers. A change of the manipulation sites and/or of the object is detected during object manipulation. The object manipulation could here be induced by the manipulation light beam. The manipulation light beam could, for example, induce the bleaching of fluorescent dyes or the release of caged compounds.

Using this procedure, for example, the contraction force of a muscle fiber can be indirectly measured. To that end, the muscle fiber is prepared with caged-compound release calcium and introduced, for examination or manipulation, into the microscope system according to the invention. For the object detection, the muscle fiber is scanned continuously with illumination light at a wavelength of 488 nm. UV light (e.g. 365 nm) is shone only in the region of the muscle fiber, with a result that the caged-compound release calcium is released so that the muscle fiber contracts. Actin or myosin was likewise preparatively coupled to the muscle-fiber ends. The actin or myosin was previously captured by an optical tweezers. The contraction of the muscle fiber causes a displacement of the actin or myosin from the starting position, the displacement being proportional to the contraction force of the muscle fiber. The contraction force can be deduced by measuring the displacement of the starting positions when the muscle contraction is triggered.

Provision is furthermore made that the object manipulation can be used to examine the passage of information from cell to cell. Information transport from cell to cell is accomplished, on the one hand, by electrical information transmission and, on the other hand, by the passage of neurotransmitters such as e.g. calcium. For instance, a caged calcium compound which can be broken up at a predetermined time by shining UV light or infrared light, may be introduced into a cell. As a result of this, the released calcium triggers a reaction in the cell, which thereupon proceeds independently of the manipulation. For examination, the entire process can be detected without interruption by the confocal scanning microscope, so that the propagation of information to the neighbour cell prepared with a fluorescent calcium indicator can be registered. It is already known that the reaction of the neighbour cell may not occur if the stimulus information enters a third cell within a specific time window. For examining this phenomenology, it is helpful to trigger an information-propagation reaction in two neighbouring cells quasi-simultaneously or with a defined time lag. These examinations require fast object detection, which can be achieved for example using a beam deflection device according to DE 196 54 210 or DE 100 33 549.

Yet other applications in cell biology, neurobiology and human genome research are conceivable with the method according to the invention.

The object detected during the examination and manipulation, together with the manipulation sites, is preferably represented on a monitor. Two- and/or three-dimensional representation is then provided. Three-dimensional representation is preferably carried out in a perspective view, the perspective viewpoint being freely selected. The selection of the viewpoint could be carried out using pointer instruments, for example with a mouse or a joystick.

To examine the object, provision is made that fluorescent and/or reflected light from the object and, optionally, also from the manipulation sites is detected. Fluorescent excitation could here also be carried out by multiphoton excitation methods, as described for example in DE 44 14 940, or U.S. Pat. No. 5,034,613.

As a function of the application in question, provision is made that the wavelength of the illumination light beam can be selected. It is possible as a result, in particular, to switch on at least one further wavelength at any time during the scanning of the sample. To that end, object illumination by a plurality of lasers and/or by the use of a multiline laser is provided.

In another variant, for example, a "mini-laboratory" could be produced in the microscope system according to the invention. In the object holder device, this mini-laboratory could have various regions in which an object undergoes various processing steps. These different regions could have different ambient or embedding media, so that suitable parametric conditions exist for the treatment step in question. An object could be transported, with the aid of the optical tweezers, from one region to another region where, for example, with continuous object detection, parts of a cell or the complete cell nucleus are excised from the cell, and thereupon transported using further optical tweezers to another region were the excised cell nucleus is processed further.

For thorough and comprehensive object examination, provision is made that an object is simultaneously scanned by at least two light beams, which are deflected by different respective beam deflection devices. Provision is then made that the beam deflection devices operate synchronously with one another. For example, one light beam could be used for single-photon excitation and a second light beam could be used for multiphoton excitation of the fluorescent object.

With a view to fast imaging of the object, the latter is scanned, and correspondingly detected, with a plurality of illumination foci or with a linear illumination pattern. For object scanning with a plurality of illumination foci, one of the arrangements known from DE 196 53 413 or EP 0 753 779, which operate in connection with two-photon fluorescent excitation, could for example be used. A linear illumination pattern could, for example, be produced by introducing an illumination slit and by using cylindrical lenses.

Particularly preferably, at least one two- or three-dimensional subregion of the object is established and is detected with increased photon statistics, with reduced scanning rate and/or with higher spatial resolution. This subregion is preferably the object subregion for examination, which is relevant to the application in question. The remaining region could be detected with reduced photon statistics, with increased or maximum scanning rate and/or with reduced spatial resolution. The overall examination of the object can hence be concentrated on the essential regions, so that a maximum information yield can be detected for these regions of the object. As an alternative to this, provision could also be made that the remaining region is not detected at all, and that the illumination beam is deflected in such a way that, from one subregion, it reaches another subregion by the shortest route. With this procedure, only the established subregions are then detected.

BRIEF DESCRIPTION OF THE DRAWINGS

There are, moreover, various possible ways of advantageously configuring and developing the teaching of the present invention. In this regard reference should be made to the patent claims and drawings. In the drawing.

DETAILED DESCRIPTION OF THE INVENTION

Figure 1:
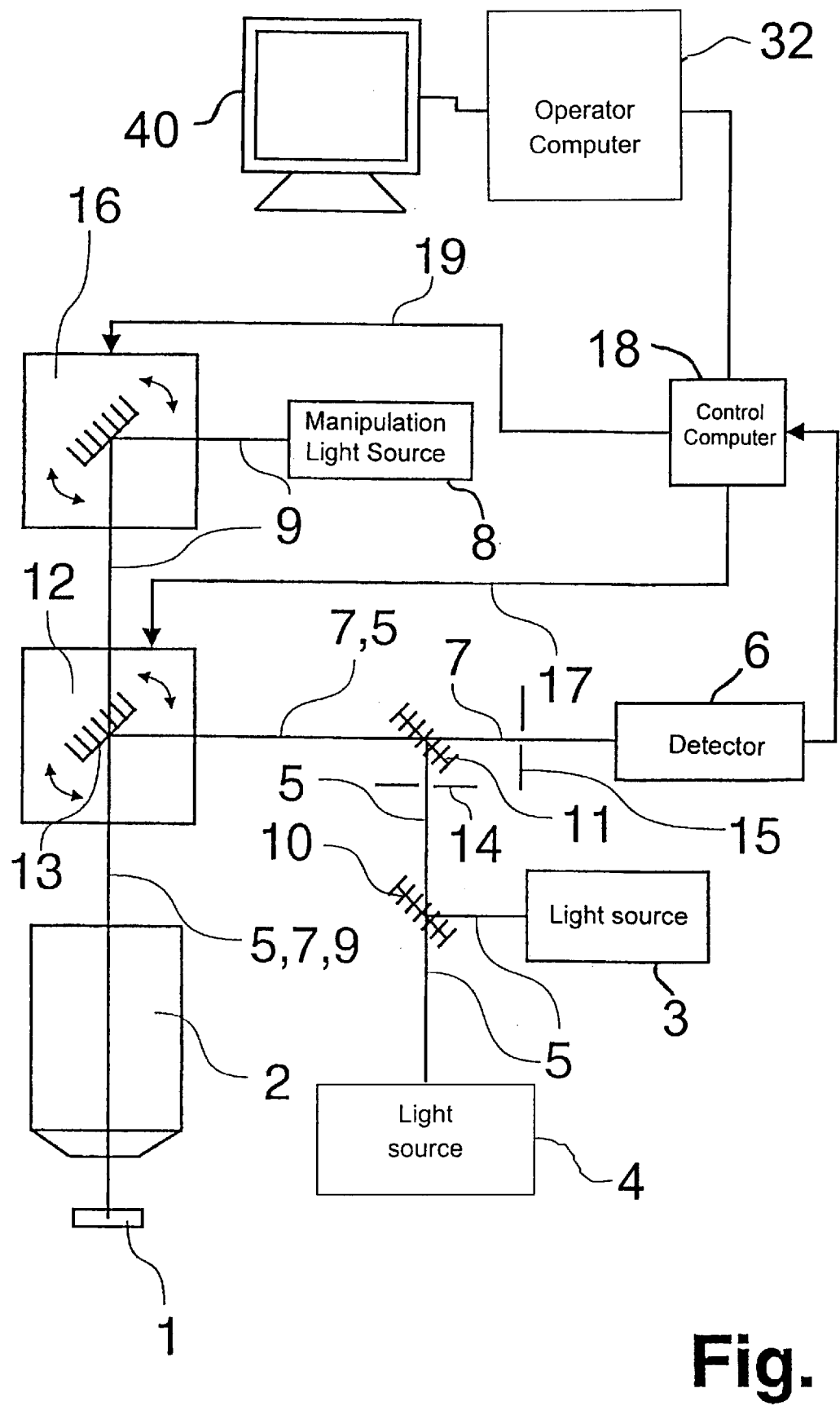
FIG. 1 shows a schematic representation of an exemplary embodiment according to the invention of a device for examining and manipulating microscopic objects.

FIG. 1 shows a device for examining and manipulating microscopic objects 1, with a microscope 2 represented merely as a microscope objective, with two light sources 3, 4 used to illuminate the object 1, an illumination beam path 5, a detector 6 used to detect the light returning from the object 1, a detection beam path 7, a second light source 8 used for the object manipulation, and a manipulation light beam path 9.

The light from the first light sources 3, 4 is combined coaxially by a beam splitter 10 and is reflected in the direction of the dichroic beam splitter 11. The illumination light from the first light sources 3, 4, reflected by the dichroic beam splitter 11, is deflected by the beam deflection device 12 in two essentially mutually perpendicular directions. To that end, a scanning mirror 13 is provided, which is cardan-suspended and can be rotated about two mutually perpendicular axes (not shown). The light reflected by the scanning mirror 13 is input into the schematically represented microscope 2, with the microscope objective 2 focusing the illumination light in the object region.

According to the invention, the microscope is a confocal scanning microscope, specifically one which has an illumination pinhole 14 and a confocal detection pinhole 15 optically conjugate therewith.

Figure 2:
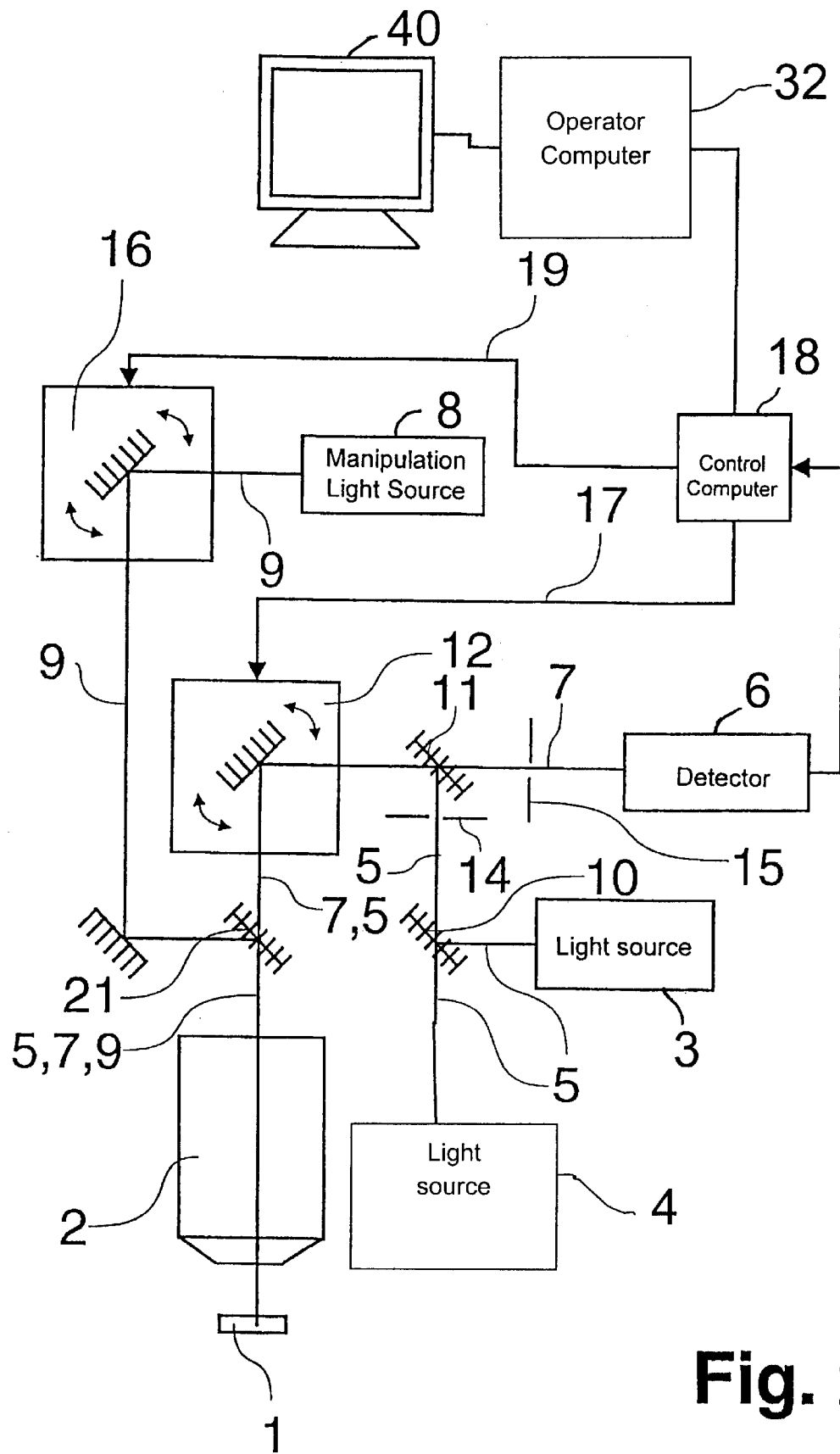
FIG. 2 shows a schematic representation of another exemplary embodiment according to the invention of a device for examining and manipulating microscopic objects.
Figure 3:
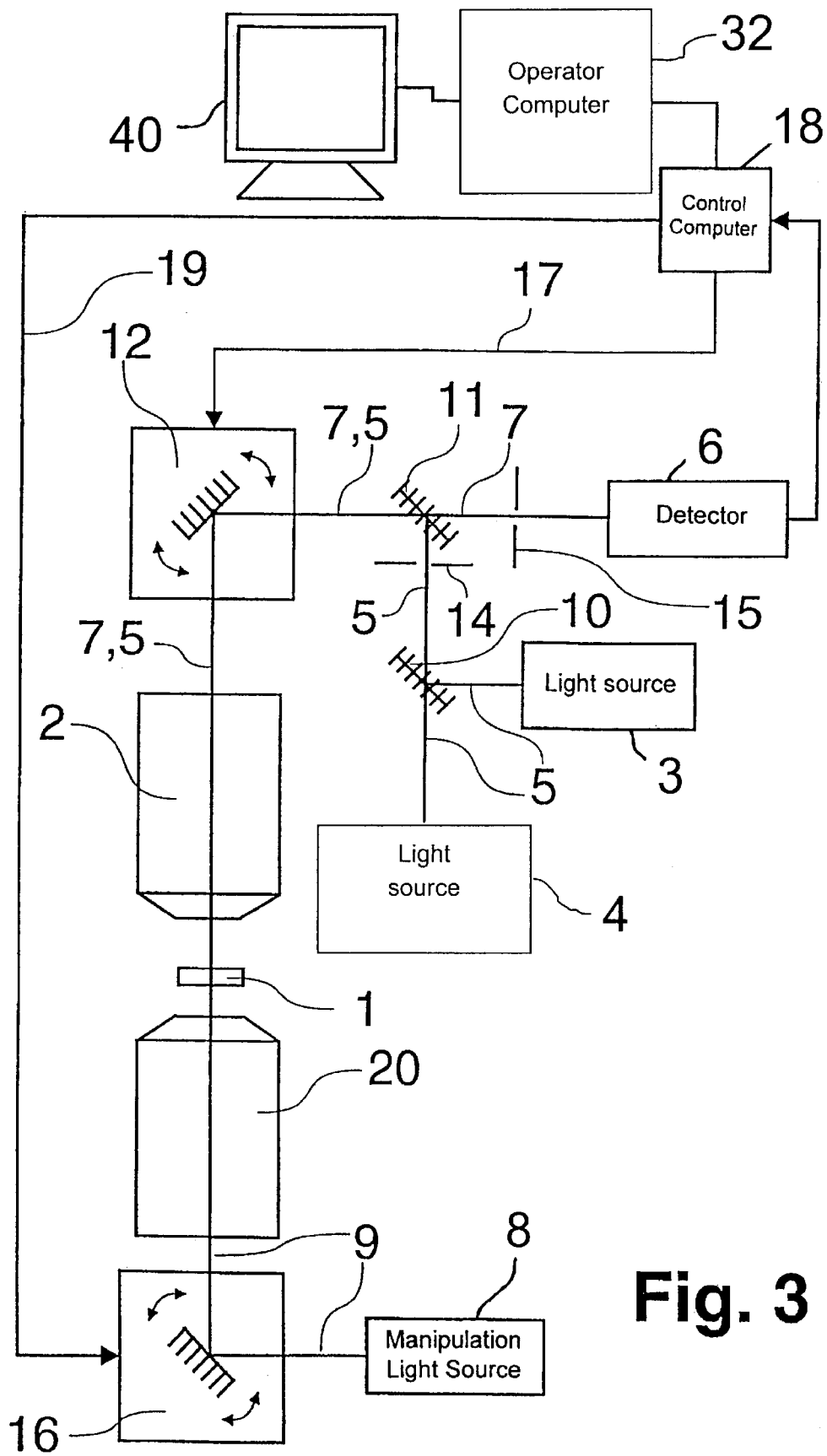
FIG. 3 shows a schematic representation of a third exemplary embodiment according to the invention of a device for examining and manipulating microscopic objects.

In the exemplary embodiments of FIGS. 1 to 3, two beam deflection devices 12, 16 are provided. The beam deflection device 12 here deflects the illumination light beam 5, whereas the beam deflection device 16 deflects the manipulation light beam 9. The deflection of the illumination light beam 5 is carried out independently of the deflection of the manipulation light beam 9. The beam deflection device 12 is driven by the control computer 18 via a connection 17. The beam deflection device 16 is driven by the control computer 18 via the control connection 19.

FIG. 3 shows that the manipulation light beam path 9 runs substantially separately from the detection beam path 7 and the illumination beam path 5. The illumination beam path 5, or the detection beam path 7, then runs through the microscope objective 2 and the manipulation light beam path 9 runs through a second microscope objective 20, which is arranged on the opposite side from the microscope objective 2 with respect to the focal plane of the microscope objective 2.

In FIGS. 1 and 2, the manipulation beam path 9 and the detection/illumination beam path 7, 5 are combined by a beam splitter 21 and 13, respectively. The beam splitter 21 in FIG. 2 is here designed as a chromatic beam splitter, which reflects light from the manipulation light source 8 to the microscope objective 2 and which is transparent for the illumination and detection light 5, 7. The scanning mirror 13 of the beam deflection device 12 in FIG. 1 is used for beam combination of the illumination/detection light 5, 7 and the manipulation light beam path 9. The scanning mirror 13 is here transparent for the light from the manipulation light source 8, but the illumination/detection light 5, 7 is reflected at the scanning mirror 13 into the microscope objective 2.

Figure 4:
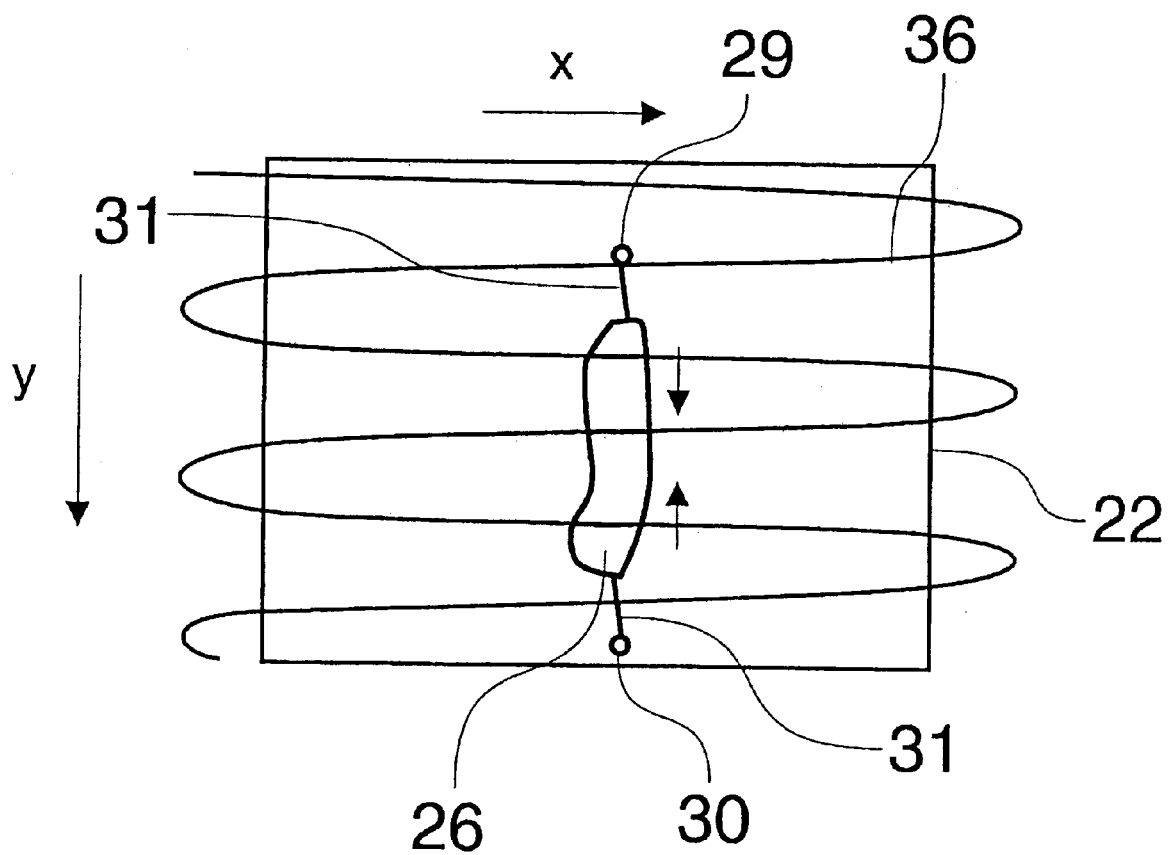
FIG. 4 shows a schematic representation of a method step according to the invention for determining contraction forces of a muscle cell.
Figure 5:
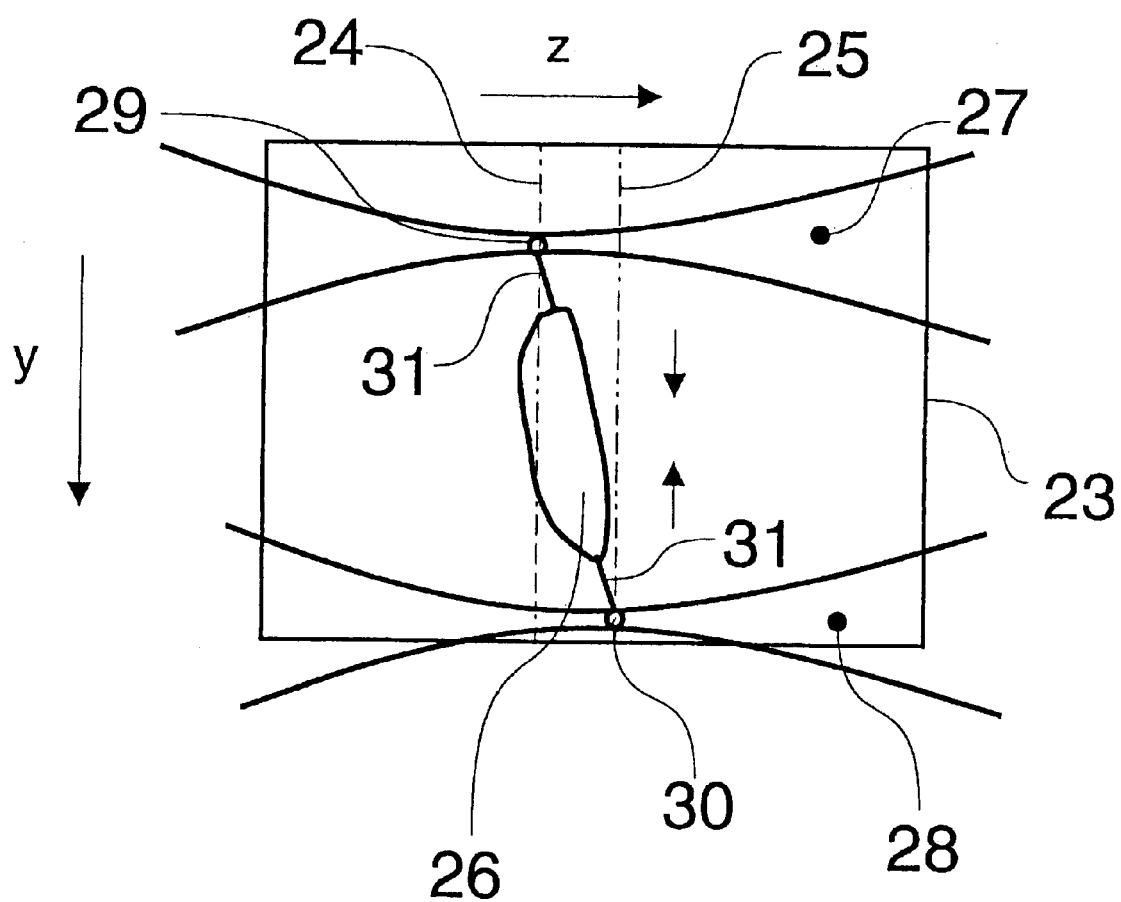
FIG. 5 shows a schematic representation of a section plane perpendicular to the plane represented in FIG. 4.

In the method according to the invention for examining and manipulating microscopic objects 1, the object manipulation is carried out simultaneously with the confocal object detection. Three-dimensional object detection is carried out during the object manipulation. FIG. 4 shows a detail of a detected three-dimensional object data record in the form of an xy section plane 22. FIG. 5 shows a detail of the same detected data record in the form of a yz section plane 23. The object manipulation is here carried out three-dimensionally, on the one hand in the xz manipulation plane 24 indicated by dots and dashes, as well as in the xz manipulation plane 25 likewise indicated by dots and dashes. The two planes 24, 25 are parallel to the focal plane of the microscope objective 2.

FIGS. 4 and 5 show how a method according to the invention is carried out for determining contraction forces of a muscle cell 26. Here, two manipulation sites 29, 30 relating to the muscle cell 26 are captured with the aid of two optical tweezers 27, 28. The manipulation sites 29, 30 are respectively connected to the muscle cell 26 via an actin bond 31. After object manipulation using a further manipulation light beam (not shown), the caged-compound release calcium prepared in the muscle cell 26 is released so that the muscle cell 26 contracts, which is indicated by the two arrows in the image details 22, 23. The muscle cell 26 is constantly detected before, during and after the object manipulation, so that the positional change of the manipulation sites 29, 30 due to the contraction of the muscle cell 26 can be detected, and quantitative evaluation of the contraction forces is hence possible.

The detected object 1, 26, together with the manipulation sites 29, 30, is represented on the monitor 40 of the operator computer 32 of the confocal scanning microscope. The representation here takes place two-dimensionally, for example in the form of the xy and yz section planes 22, 23 of FIGS. 4 und 5. FIG. 4 schematically represents the scanning pattern 36 of the illumination focus, the scanning pattern having a large scanning interval in the y direction to simplify the representation.

Figure 6:
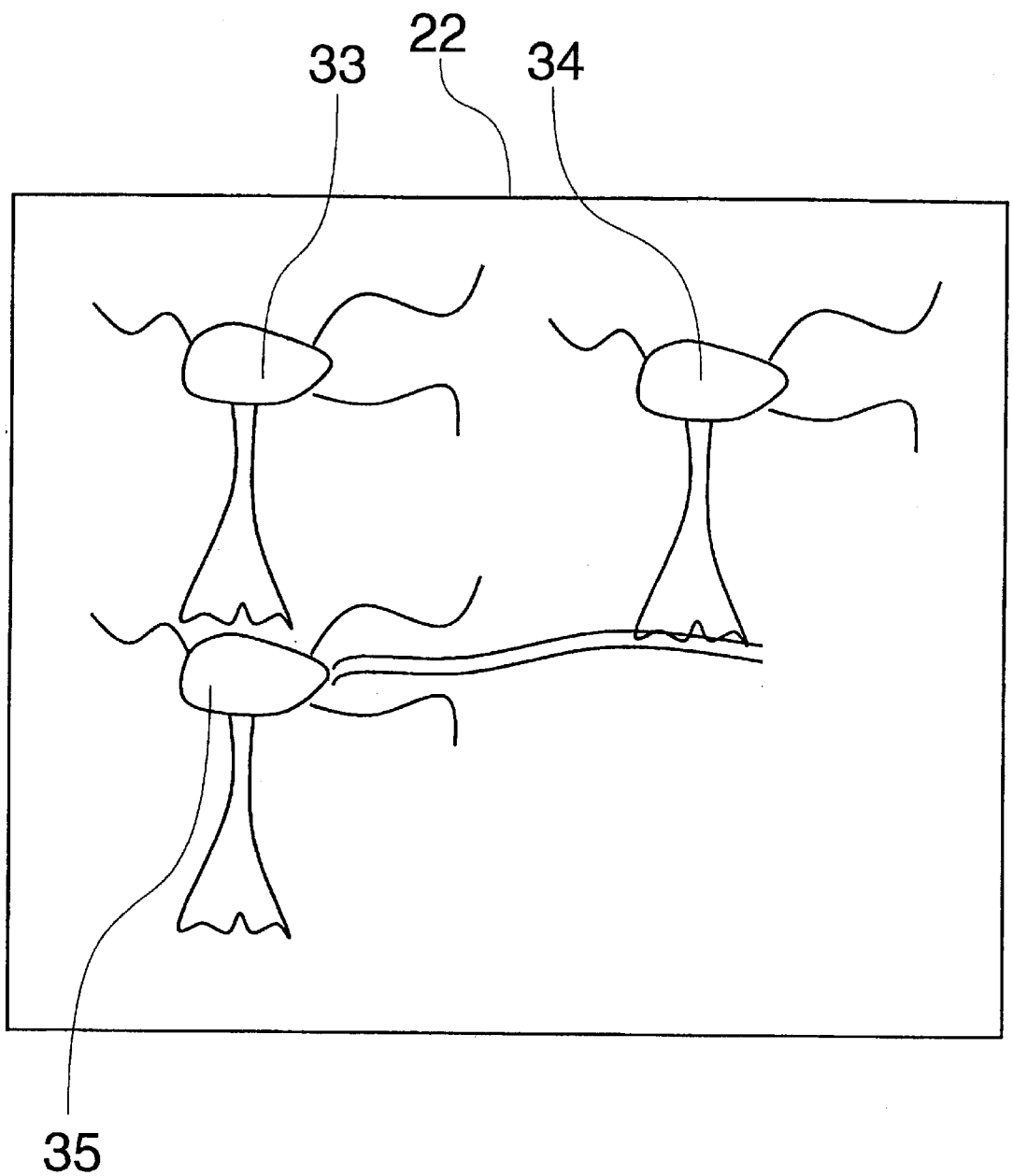
FIG. 6 shows a schematic representation of a method step according to the invention for examining the information propagation between three cells.

FIG. 6 shows an xy section plane 22 of an image taken of three cells 33, 34, 35. The information propagation from cell to cell is studied in these cells. Here, UV light for the object manipulation is applied to each of the cells 34 and 35, so that caged-calcium compounds prepared in the cells are broken up and the released calcium triggers a reaction in the cell 34 or 35, respectively. Reaction of cell 35 to cell 33 may not occur if, within a specific time window, the stimulus information of cell 34 arrives at cell 33. To that end, UV light is applied to the two cells 34, 35 with a defined time lag. This time interval is constantly reduced when the experiment is repeated, until UV light is applied quasi-simultaneously to both cells 34, 35. A fluorescent calcium indicator likewise prepared in the cells makes it possible to detect the information propagation.

Lastly, it should more particularly be pointed out that the exemplary embodiments discussed above are merely used to describe the claimed teaching, but do not restrict it to the exemplary embodiments.

What is claimed is:

1. A device for examining and manipulating microscopic objects comprising:
   a confocal scanning microscope,
   a first light source for illuminating the object, wherein the first light source defines an illumination beam path,
   a detector for detecting the light returning from the illuminated object, wherein the detector defines a detection beam path, the illumination beam path and the detection beam path overlapping partially so as to define a detection/illumination beam path,
   a second light source for manipulating the object, wherein the second light source defines a manipulation light beam path,
   a first beam deflection device provided in the illumination beam path, and
   a second beam deflection device provided in the manipulation beam path, and
   a switchable optical device configured to combine light in the manipulation beam path and light in the detection/illumination beam path.

2. Device according to claim 1, wherein the first beam deflection device and the second beam deflection device operate independently from each other.

3. Device according to claim 1, wherein the focus position of the manipulation light along the optical axis is changeable.

4. Device according to claim 3, wherein a focusing means is arranged mobile between the second light source and the object.

5. Device according to claim 1, wherein the manipulation light beam is used as optical tweezers and/or as a nanoscalpel.

6. Device according to claim 5, wherein a zoom lens is provided in the manipulation light beam path for changing the shape of the manipulation light focus.

7. Device according to claim 1, wherein at least one spectrally selective element is used to input the illumination and/or manipulation light.

8. Device according to claim 7, wherein the spectrally selective element consists essentially of an AOTF (acousto-optical tunable filter), AOBS (acousto-optical beam splitter), AOD (acousto-optical deflector) or EOM (electro-optical modulator) and are driven by a control computer, preferably as a function of the illumination and/or manipulation beam position.

9. A device for examining and manipulating microscopic objects comprising:
   a confocal scanning microscope,
   a first light source for illuminating the object, wherein the first light source defines an illumination beam path,
   a detector for detecting the light returning from the illuminated object, wherein the detector defines a detection beam path, the illumination beam path and the detection beam path overlapping partially so as to define a detection/illumination beam path, a second light source for manipulating the object, wherein the second light source defines a manipulation light beam path, a first beam deflection device provided in the detection/illumination beam path, a second beam deflection device provided in the manipulation light beam path, wherein the manipulation light beam path and the illumination light beam path are separated from each other, and at least one switchable beam splitter provided prior to the microscope objective for combining light in the manipulation light beam path and light in the illumination light beam path.

10. Device according to claim 9, wherein the beam splitter is designed as a chromatic beam splitter or as a polarization beam splitter.

11. Device according to claim 10, characterized in that a scanning mirror of a beam deflection device is used for the beam combination.

12. Device according to claim 9, characterized in that the focus position of the manipulation light along the optical axis is changeable.

13. Device according to claim 12, wherein a focusing means is arranged mobile between the second light source and the object.

14. Device according claims 9, wherein the manipulation light beam is used as optical tweezers and/or as a nanoscalpel.

15. Device according to claim 9, wherein at least one spectrally selective element is used to input the illumination and/or manipulation light.

16. Device according to claim 15, characterized in that the spectrally selective element consists essentially of an AOTF (acousto-optical tunable filter), AOBS (acousto-optical beam splitter), AOD (acousto-optical deflector) and/or EOM (electro-optical modulator) and can be driven by a control computer, preferably as a function of the illumination and/or manipulation beam position.

17. A method for examining and manipulating microscopic objects, with a confocal scanning microscope, comprising the steps of:

illuminating the object with at least one light source;

detecting the light returning from the object, switching an optical device for combining a manipulation light beam and light in a detection/illumination beam path, and manipulating the object with a second light source wherein the manipulation of the object is carried out simultaneously with the confocal object detection and the detection is done three-dimensionally during the manipulation.

18. Method according to claim 17, wherein the object manipulation is carried out three-dimensionally, and especially in the planes parallel to the focal plane of a microscope objective.

19. Method according to claim 17, wherein a determination of the bonding forces between individual objects or object regions is carried out.

20. Method according to claim 19, wherein at least two manipulation sites relating to the object or the object region are captured and displaced in the captured state with the aid of the optical tweezers.

21. Method according to claim 19, characterized in that at least two manipulation sites relating to the object or the object region are captured with the aid of the optical tweezers, and in that a change of the manipulation sites and/or of the object are detected during object manipulation.

22. Method according to claim 17, wherein manipulating comprises bleaching of fluorescent dyes and/or the release of caged compounds.

23. Method according to claim 21, wherein the detected object is represented together with the manipulation sites preferably on a monitor.

24. Method according to claim 23, wherein the perspective viewpoint of a three-dimensional representation of the manipulation site is freely selected.

25. Method according to claim 17, wherein an object is simultaneously scanned by at least two light beams, which are deflected by different respective beam deflection devices.

* * * * *